United States Patent Office 3,632,854
Patented Jan. 4, 1972

3,632,854
PRODUCTION OF ESTERS
George Colin William Randall, Sutton, Surrey, England, assignor to BP Chemicals (U.K.) Limited, London, England
No Drawing. Filed Mar. 5, 1969, Ser. No. 804,658
Claims priority, application Great Britain, Mar. 9, 1968, 11,650/68
Int. Cl. C07c 69/54
U.S. Cl. 260—410.6                         7 Claims

ABSTRACT OF THE DISCLOSURE

The present invention is a process for producing hydroxy esters of carboxylic acids by reacting the acid with an epoxy compound in the presence of a chromium salt of a carboxylic acid as catalyst. The salt is preferably a salt of the acid whose ester is being prepared.

---

The present invention relates to the production of esters particularly esters formed by reaction of an epoxy compound with an unsaturated carboxylic acid, for example 2-hydroxyalkyl acrylates and methacrylates.

2-hydroxyalkyl arcylates and methacrylates may be made by reaction of an alkylene oxide with acrylic or methacrylic acid, suitably at about 100° C. and in the presence of a basic catalyst such as a tertiary amine. In one process as tertiary amine catalyst is present in an anion exchange resin, so that the catalyst may be readily separated from the product by filtration on completion of the reaction. However the filtration process is long and difficult and a significant amount of the product may remain absorbed on the resin particles.

Hydroxyalkyl acrylates and methacrylates have also been separated from the reaction mixture in which they are produced by distillation. Hydroxyalkyl acrylates and methacrylates are difficult materials to distill in that they are highly polymerisable monomers of moderately high boiling point (90–100° C. at 5–10 mm. pressure). In these circumstances distillation preferably consists of a simple flash evaporation rather than any form of fractional distillation. In order to obtain a high purity product from a flash evaporation the crude distilland needs to contain a high percentage of the desired product as there will be little or no change in composition because of the lack of fractionation.

A further problem which arises is that on distillation the products are likely to polymerise even in the presence of an inhibitor and at reduced temperature and pressure.

The present invention is a process for producing esters, particularly hydroxyalkyl acrylates and methacrylates which overcomes to a considerable extent the problems encountered in obtaining pure products in high yields. For many applications of the 2-hydroxyalkyl acrylates and methacrylates the presence of excessive quantities of diester materials, such as ethylene glycol diacrylate, is harmful in that it may lead to the formation of insoluble cross-linked polymers during the desired polymerisation or copolymerisation of the 2-hydroxyalkyl acrylate or methacrylate. A previously used method of controlling the formation of diester has been to terminate the reaction at an acid number of from 2 to 40 mg. KOH/g. With the present invention such a limit is not needed and the reaction may be taken virtually to completion.

Accordingly the present invention is a process for the production of a carboxylic acid ester by reacting in the liquid phase an epoxy compound and a carboxylic acid at an elevated temperature in the presence of a pre-formed chromium salt of a carboxylic acid as catalyst.

It is a preferred feature of the invention that the chromium salt is a salt of the acid whose ester is being prepared. For example chromium acrylate is used as the catalyst in the production of 2-hydroxyalkyl acrylate esters, and chromium methacrylate is used as catalyst in the production of 2-hydroxyalkyl methacrylate esters. However, chromium acrylate may be used as catalyst in the production of 2-hydroxyalkyl methacrylate, it being such an effective catalyst that it is only needed in low concentrations, and therefore any by-products such as the hydroxyalkyl esters of acrylic acid formed as a result of using chromium acrylate are in such low concentrations as not to effect the performance of the product. Similarly chromium methacrylate may be used to catalyse reaction of acrylic acid. It has been found that the use of chromium acrylate or methacrylate as catalyst is particularly advantageous in that it gives a shorter reaction time together with a purer product containing less by-products as indicated by gas-phase chromatography than with the processes used hitherto.

The amount of chromium salt employed in the reaction may vary between moderately wide limits for example from 0.1 to 5.0% by weight based on the weight of the acid employed. The catalyst should preferably contain up to about 15% moisture. The chromium salt may be prepared in situ, by heating chromium hydroxide for a short time with the acid, in order to effect solution. The reaction is then continued in the usual manner.

Use of chromium salts as catalysts enables an improved separation of the product from the catalyst to be effected by distillation at reduced pressure.

The invention is particularly applicable to ethylenically unsaturated acids, which may in general contain up to 24 carbon atoms, for example monocarboxylic acids such as acrylic acid, methacrylic acid, crotonic acid and linseed fatty acids, or polycarboxylic acids such as fumaric acid, maleic acid, itaconic acid and citaconic acid and half ester of these acids.

The epoxy compound may be an alkylene oxide derived from a straight chain, branched chain or cyclic olefin, such as, for example, ethylene, propylene, ethylene, isobutylene, heptylene, cyclohexene or styrene. Epichlorohydrin or glycidyl ethers of monohydric alcohols may also be used.

A slight molar excess of epoxy compound is preferred in the reaction mitxure, for example, 1.05 to 1.2 moles of epoxy compound per mole of acid.

When necessary, a polymerisation inhibitor may be employed in the reaction which is any of the polymerisation inhibitors well known in the art. Examples of such inhibitors are hydroquinone, para-methoxyphenol, nitric oxide and methylene blue. The concentration of inhibitor may be up to 1% by weight. When using nitric oxide as inhibitor, the reaction may be carried out in an atmosphere of nitric oxide.

The reaction of the present invention may take place at an elevated temperature, for example 40 to 120° C. Temperatures above 120° C. may result in excessive polymer formation. Temperatures below 40° C. may be employed but at such temperatures the reaction time may be undesirably long. The reaction may be carried out at a pressure above atmospheric, e.g. about 40 p.s.i.g. The process may be operated batchwise or continuously. The course of the reaction may be followed by measuring the acidity of the reaction mitxure from time to time and hence determining the content of unreacted acid.

A preferred process when using acrylic or methacrylic acid and an alkylene oxide is as follows: an autoclave is charged with acid (containing an inhibitor and catalyst). The autoclave is evacuated and the vacuum broken with nitrogen; the mixture is then heated to a temperature in the range 40 to 120° C. Alkylene oxide is then slowly pumped into the vessel, to give a steady reaction pressure of say 20 to 60 p.s.i.g. The reaction thus commenced is continued at a temperature within the range 40 to 120° C. until the acid number of the mixture, determined by titration of selected portions of the mixture, is at the desired value. Immediately the desired acid number is reached and the reaction mixture is crash cooled by indirect heat exchange, for example by contact with water cooled coils. Vacuum is then applied to the autoclave to remove excess alkylene oxide. The 2-hydroxyalkyl acrylate or methacrylate may be removed from the catalyst by distillation. The process of the present invention is further illustrated by the following examples.

EXAMPLE 1

430 gm. of methacrylic acid inhibited with 0.1% p-methoxyphenol was charged into an autoclave with 13 gm. chromium acrylate (3% w./w. on acid). The vessel was purged with nitrogen by evacuation and breaking the vacuum with nitrogen and then heated to 80° C. 320 gm. of propylene oxide (10% excess) was slowly pumped into the vessel with constant stirring. After 75 minutes reaction at 80° C. the reactor was cooled and vacuum applied to remove excess propylene oxide. The product which had an acid number of 0.9 mgm. KOH/gm. and contained 0.2% propylene glycol dimethacrylate was freed from the catalyst by distillation under reduced pressure.

When the above procedure was repeated using chromium trichloride hexahydrate as catalyst, the catalyst concentration being the same based on the weight of chromium, the reaction took 150 minutes and the final product had an acid number of 15 mgm. KOH/gm.

EXAMPLE 2

432 gm. of acrylic acid, inhibited with 0.2% hydroquinone, was charged into an autoclave with 13 gm. of chromium acrylate (3% w./w. on acid). The vessel was purged with nitrogen by the method of Example 1 and heated to 80° C. to dissolve the catalyst. 291 gm. of ethylene oxide (10% excess) was added gradually with stirring and reacted at 60° C. for 3 hours. The reactor was cooled and evacuated to remove excess ethylene oxide. The product which had an acid number of 0.4 mgm. KOH/gm. and contained 0.5% ethylene glycol diacrylate, was freed from the catalyst by distillation under reduced pressure.

When the above procedure was repeated using ferric acrylate as the catalyst, it was found that after a reaction time of 4 hours the acid number was still 11.5 mgm. KOH/gm.

EXAMPLE 3

In three runs 430 gm. of inhibited methacrylic acid (0.1% p-methoxyphenol) was charged to a stirred autoclave together with 13 gm. of chromium acrylate. The vessel was evacuated and purged with nitrogen. After heating to 60° C. propylene oxide was added at a rate sufficient to maintain a pressure of 20 lb./sq. in. until a total of 320 gm. had been added. The final stages of the reaction were followed in the usual manner by determining the acidity of a small sample withdrawn from the autoclave.

| Example No. | 1 | 2 | 3 |
|---|---|---|---|
| H₂O content of catalyst, percent | 1 | 10 | 15 |
| Reaction time, hr. | 3 | 2 | 1¾ |
| Acid No.: mg. KOH/gm. of product | 6.4 | 1.8 | 1.0 |

It can be seen from these results that the higher moisture contents have given increased reaction rates as shown by lower final acid numbers in shorter reaction times.

EXAMPLE 4

Distillations of hydroxypropylmethacrylate were carried out in a 3-necked round-bottomed flask fitted with a Claisen head carrying a thermometer and gas inlet tube. A further thermometer was situated to indicate the temperature of the flask contents. Conventional laboratory condensing and vacuum equipment was used and the flask was heated by means of an oil-bath. During the distillation it was attempted to take an approximately 10% heads fraction followed by as large a main fraction as possible. Results of 4 runs in the table below record the size of the various fractions obtained expressed as a percentage of the weight of material charged to the flask.

|  | 1 | 2 | 3 | 4 |
|---|---|---|---|---|
| Catalyst used | Pyridine | Anion exchange resin | Ferric acrylate | Chromium acrylate |
| Nature of distillation residue | Very gelatinous | Very gelatinous | Black, very viscous | Green, mobile transferable |
| Percent yields: |  |  |  |  |
| 1st fraction | 8.4 | 9.5 | 12.8 | 9.2 |
| Main fraction | 34.8 | 57.3 | 56.4 | 83.6 |
| Residues | 52.7 | 32.0 | 30.4 | 6.0 |
| Main fraction colour | Colourless | Colourless | Pale yellow | Colourless |
| Main fraction B.P., °C | 94°/7 mm | 94°/7 mm | 90–95°/5–7 mm | 81°/4 mm |

It can be seen from these results that when using chromium acrylate as catalyst higher yields of distilled product were obtained. Also the residues fraction showed no sign of polymerization and could be readily removed from the apparatus for recycling or other treatment.

I claim:
1. A process for the production of a 2-hydroxyalkyl ester of an unsaturated aliphatic carboxylic acid which comprises reacting in the liquid phase at elevated temperature an epoxy compound and an unsaturated aliphatic carboxylic acid of up to 18 carbon atoms in the presence of a pre-formed chromium salt of an unsaturated aliphatic carboxylic acid of up to 18 carbon atoms at catalyst.
2. A process according to claim 1 wherein the unsaturate aliphatic carboxylic acid is ethylenically unsaturated.
3. A process according to claim 2 wherein the acid is acrylic acid, methacrylic acid, crotonic acid, linseed fatty acid, fumaric acid, maleic acid, itaconic acid or citaconic acid.
4. A process according to claim 1 wherein the epoxy compound is ethylene oxide, propylene oxide, butylene oxide, isobutylene oxide, cyclohexene oxide, styrene oxide, epichlorohydrin or a glycidyl ether of a monohydric alcohol.
5. A process according to claim 1 wherein the chromium salt is a salt of the acid whose ester is being prepared.
6. A process according to claim 1 wherein the catalyst contains from 0 to 15% by weight of moisture.
7. A process according to claim 1 wherein a polymerisation inhibitor selected from the group consisting of hydroquinone, para-methoxyphenol, nitric oxide and methylene blue is present.

References Cited

UNITED STATES PATENTS

| 3,399,229 | 8/1968 | Kunze et al. | 260—485 |
| 3,441,599 | 4/1969 | Murayama | 260—486 |

FOREIGN PATENTS

| 871,767 | 6/1961 | Great Britain | 260—486 |

LEWIS GOTTS, Primary Examiner

E. G. LOVE, Assistant Examiner

U.S. Cl. X.R.

260—410, 410.5, 485 G, 486 B